(No Model.)

A. HAGGERTY.
WHIFFLETREE CONNECTION.

No. 481,301. Patented Aug. 23, 1892.

Witnesses.
A. Ruppert
P. F. Mancoso

Inventor.
Alonzo Haggerty
Per
Thomas P. Simpson
Atty

UNITED STATES PATENT OFFICE.

ALONZO HAGGERTY, OF CAMBRIDGE, PENNSYLVANIA.

WHIFFLETREE CONNECTION.

SPECIFICATION forming part of Letters Patent No. 481,301, dated August 23, 1892.

Application filed January 21, 1892. Serial No. 418,814. (No model.)

*To all whom it may concern:*

Be it known that I, ALONZO HAGGERTY, a citizen of the United States, residing at Cambridge, in the county of Crawford and State of Pennsylvania, have invented certain new and useful Improvements in Whiffletree Connections; and I do hereby declare the following to be a full, clear, and exact description of the invention, such as will enable others skilled in the art to which it appertains to make and use the same.

The special object of the invention is to connect the doubletree with the pole of a vehicle or the single with the double tree, so that all the usual straps, hooks, rings, and clips may be dispensed with.

The invention consists in so pivoting the doubletree to the pole and the single to the double tree that the necessary play on the pivot to each side may be permitted while all unnecessary play is effectually prevented.

Figure 1:
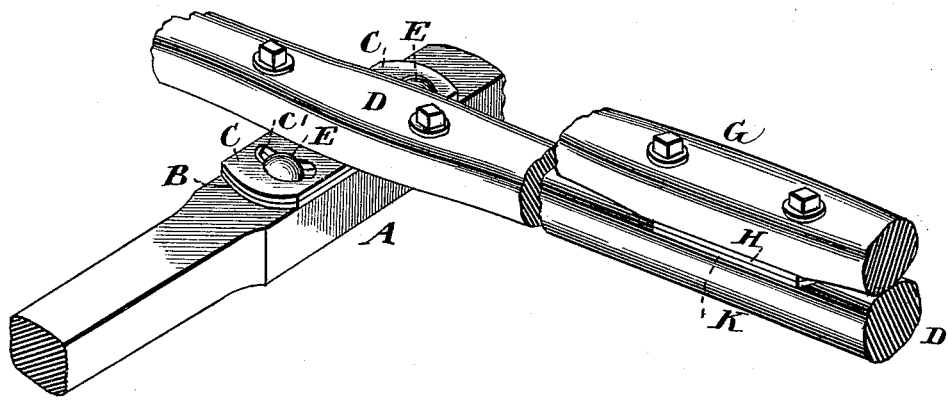
Figures 2, 3:
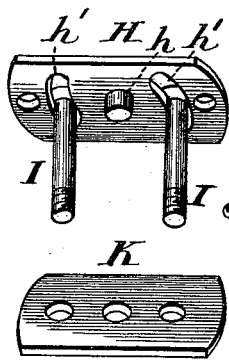

Figure 1 of the drawings is a perspective view showing the doubletree connected with tongue or pole and the single to the double tree according to my invention; Fig. 2, a detail view of the plates which connect the doubletree with the pole; Fig. 3, a similar view of the plates which connect the single and double tree.

In the drawings, A represents the pole or tongue of a vehicle, and B a plate which I bolt to the upper side thereof. The plate C is made with the pivot $c$ at its middle and two arc slots $c'$ $c'$ in the transverse wings, the longitudinal straps $C^2$ $C^2$ being merely for the purpose of fastening it to the doubletree D. The plate B is provided with a hole $b'$, which turns on the pivot $c$ of the plate C.

E E are two headed bolts, whose shanks pass down through the arc slots $c'$ $c'$ and the pole A, receiving end nuts to hold them in place. By these means the doubletree receives a necessary but limited play to each side, but has no strap or bolt.

G is a singletree, to the under side of whose middle is bolted the plate H, with a central pivot $h$ and the arc slots $h'$ $h'$. Down through these arc slots pass the pivot-bolts I I, whose shanks pass through holes in a plate K, screwed to the top of the doubletree, their ends receiving nuts to retain them in position. By these means the singletree plays around in the proper arcs, but no farther, while the usual clips, rings, and hooks become unnecessary.

Having thus described all that is necessary to a full understanding of my invention, what I claim as new, and desire to protect by Letters Patent, is—

In connectors of single to double trees, the singletree-plate constructed with a central stud and an arc slot on each side thereof, in combination with two headed and end-threaded bolts passing through said arc slots and carrying end nuts below the doubletree, whereby the plates are held at each end to one another and not at the center, thereby dispensing with the ordinary central king-bolt and preventing the ends of singletree from rising up.

In testimony whereof I affix my signature in presence of two witnesses.

ALONZO HAGGERTY.

Witnesses:
A. B. RICHMOND,
CHAS. E. RICHMOND.